UNITED STATES PATENT OFFICE.

HERMANN SCHULZE-BERGE, OF PITTSBURG, PENNSYLVANIA, ASSIGNOR OF ONE-HALF TO JESSE H. LIPPINCOTT, OF SAME PLACE.

PROCESS OF DECORATING GLASS, CHINA-WARE, AND SIMILAR ARTICLES.

SPECIFICATION forming part of Letters Patent No. 276,896, dated May 1, 1883.

Application filed November 8, 1882. (No specimens.)

*To all whom it may concern:*

Be it known that I, HERMANN SCHULZE-BERGE, of Pittsburg, in the county of Allegheny and State of Pennsylvania, have invented a new and useful Improvement in Processes of Decorating Glass, China-Ware, and Similar Articles; and I do hereby declare the following to be a full, clear, and exact description thereof.

I have in other specifications described certain methods of decorating glassware by depositing upon the surface of the glass, in various ways therein set forth, the salts of fluorine, as fluoride of sodium and fluoride of potassium, also fixed alkalies and their salts, as caustic soda or caustic potash, and the carbonates, phosphates, and sulphates of soda and potash, and the means of producing, as described in said specifications, a reaction between the salts of fluorine in the one case and the fixed alkalies in the other case, and the silicate of soda contained in the glass. When the salts of fluorine are deposited on the surface of the glassware it is then exposed to heat in a furnace, sufficient to volatilize and burn off the volatile and solid particles of the varnish, mucilage, paper, and other substances used for applying the dry salts to the surface of the glass. The heat of the furnace is then raised sufficiently to cause a reaction between the fluorine and silica, when the effect known as "etching" is produced. When the fixed alkalies or their salts are employed a similar process is employed, the heat being raised until the alkali forms a reaction with the silica of the glass and leaves marks on the glass more or less opaque, or in case of some of the salts of the alkalies a transparent but crystallized effect.

I have also described in another specification an improved method of decorating glass and china ware with fusible metallic colors by depositing the coloring-matter on the surface of the glass or china ware in various ways, and then exposing the article to be decorated to sufficient heat in a furnace to fuse the metallic colors on the surface of the glass or china ware.

My present invention consists in a method differing from those above referred to of applying the fluoride salts or alkalies or alkaline salts or metallic coloring-matter to the surface of glass or china ware as a preliminary step to the subsequent treatment described in said several specifications for producing the reaction referred to, or burning the colors on the articles to be decorated.

In order to enable others skilled in the art to make use of my present invention, I will proceed to describe its use and application.

For the purpose of applying the several articles mentioned to the surface of glass or china ware I employ threads or reticulated thread fabrics — such as lace, blonde, &c., which are not close in their texture, but have sufficient interstices between the threads to imprint distinct lines upon the article to be decorated. The threads or lace should be of vegetable fiber or of silk, other animal threads, as hair, &c., being unsuitable. The thread or lace should be washed, so as to remove any matter which would discolor the article to be decorated. If of cotton, the thread or lace may, if preferred, be treated with nitric and sulphuric acids, and then washed, in the well-known method of changing cotton fiber into dinitro-celluloid, the advantage of which is that it becomes more quickly and easily combustible, and leaves on combustion little or no ash. Linen fibers or lace fabrics may be used; but they do not give as good a result as silk or cotton. The threads of which the lace is composed should not be tightly twisted, and should be of uniform thickness throughout the fabric, as that produces a better result, and the finer the threads are the better. Wide-meshed lace, having large interstices between the threads, is preferable. The threads or lace fabric previously washed and dried, and, if preferred, converted into dinitro-celluloid, are then immersed in the preparation to be applied to the glass or china ware. If for etching glass, the preparation to be used is an aqueous solution of fluoride of soda, or of other soluble salt of fluorine; or the preparation may consist in the dry fluoride finely powdered and intimately mixed with Venice turpentine or other varnish. If the object is to mark the surface of glass by means of a fixed alkali, a solution is made of the desired salt—such as carbonate of soda, sulphate of soda, phosphate of soda, or the carbonate, sulphate, or phosphate of potash. If the purpose is to apply fusible mineral colors to the surface of glass or china ware, the desired metallic oxides are finely powdered and mixed with some suitable vehicle, as Venice turpentine or other varnish.

It is needless here to specify all the various vehicles which may be employed for holding the fluorides, alkalies, or coloring-matter to be used, as any fluid or semi-fluid which will hold them in suspension or solution without injuriously affecting their action upon the glass or china ware, and which may be removed by the action of heat, leaving the fluoride, alkali, or coloring-matter as a deposit on the surface of the glass or china, and which is sufficiently liquid to be absorbed by the threads or lace fabrics, will suffice as equivalents of the substances I have mentioned. After the threads or lace fabric has imbibed the solution or mixture to be applied to the glass or china it is dried, and is then ready for use.

The method of application is as follows: The object, of glass or china ware, or that portion of it which is to receive the decoration, is covered with a thin coating or film of some transparent and quick-drying varnish. The threads (if separate threads are used) or the lace fabric impregnated, as before described, with its fluoride, alkali, or coloring-matter, is then carefully applied to and pressed upon the varnished surface, care being taken that each thread and every part of the fabric is closely adherent to the surface of the article. The article to be decorated is then placed in a furnace, at a gentle heat, which is gradually increased until the desired operation is complete. If possible to do so, it would be better to place the article of glass, &c., having the impregnated lace fabric or threads adherent thereto, in such a position in the furnace that the lace, &c., may lie upon the glass surface—that is to say, that the decorated surface may be as nearly as possible in a horizontal position, with the decorated surface uppermost, as in the operation of firing the lace has a tendency to fall off before the operation is completed. The first effect of the heat is to vaporize and carry off the volatile portions of the varnish or other vehicle employed, then as the heat is increased to char and burn off the carbon and organic matter of the varnish and threads, at which stage the chemical to be applied alone remains deposited on the surface of the glass or china, and then the heat is raised to the point required. If the threads are impregnated with alkali, the final degree of heat must be such as will effect the reaction between the alkali and the silica of the glass, which will vary, however, with the proportion of alkali in the glass. If the threads are impregnated with fluorides, the final degree of heat will be about a dark red, at which the etching effect is produced. If the threads are impregnated with coloring-matter, the ultimate degree of heat required will be such as to fuse the particular metallic oxide employed, which is well known to those skilled in the art of burning in colors on china or glass. After the ultimate degree of heat has been attained and continued for a short time the heat is gradually reduced until the furnace is cold, or nearly so, and then the operation is finished.

Having thus described my improvement, what I claim as my invention, and desire to secure by Letters Patent, is—

The process herein described of applying chemical substances—such as fluoride of sodium, carbonate of potash, or fusible metallic oxides—to the surface of glassware, china, or porcelain, by impregnating threads or lace fabrics of silk or vegetable fiber with a solution or liquid mixture containing such substances, and applying such impregnated fabric to the surface of the glass or china by means of varnish or its equivalent, as a preliminary step to the application of heat for the production of the necessary reaction of the fluorides or alkalies with the silica of the glass or the fusing of the metallic colors on the surface of the glass or china ware, substantially as herein described, and for the purposes set forth.

In testimony whereof I have hereunto set my hand this 26th day of October, A. D. 1882.

HERMANN SCHULZE-BERGE.

Witnesses:
 T. B. KERR,
 W. B. CORWIN.